United States Patent [19]

Roche

[11] Patent Number: 5,341,055

[45] Date of Patent: Aug. 23, 1994

[54] COMBINATION RECIPROCATING MOTOR AND INVERTER

[76] Inventor: Robert J. Roche, 719 Cedar St., Erie, Pa. 16503

[21] Appl. No.: 925,771

[22] Filed: Aug. 7, 1992

[51] Int. Cl.[5] .......................................... H02K 33/12
[52] U.S. Cl. .......................................... 310/24; 310/17
[58] Field of Search ........................ 310/17, 23, 34, 24, 310/35

[56] References Cited

U.S. PATENT DOCUMENTS

| | | | |
|---|---|---|---|
| 1,978,688 | 7/1993 | Petersen | 310/113 |
| 2,104,707 | 1/1938 | Rawlings | 310/67 A |
| 4,019,103 | 4/1977 | Davis et al. | 318/37 |
| 4,507,579 | 3/1985 | Turner | 310/23 |
| 4,567,407 | 1/1986 | Ecklin | 318/140 |
| 4,631,455 | 12/1986 | Taishoff | 318/37 |

FOREIGN PATENT DOCUMENTS 3243187  10/1991  Japan .

Primary Examiner—Steven L. Stephan
Assistant Examiner—Judson H. Jones

[57] ABSTRACT

An electric motor which uses electric current to produce a magnetic field emitted from electromagnet(s) 5 and 6, resulting in the motion of a permanent magnet(s), serving as piston(s) 9 and 10; this by the interaction of their magnetic fields. The motion of the piston(s) shall result in the inversion of electricity due to the piston(s) passage through induction coils 11 and 12.

The invention may serve many purposes including, but not limited to, a power plant for a means of mechanical locomotion, the driving force necessary for machinery, gadgetry, or hydraulic equipment.

1 Claim, 5 Drawing Sheets

COMBINATION RECIPROCATING MOTOR AND INVERTER

BACKGROUND—FIELD OF INVENTION

This invention relates to electric motors, specifically, to improve efficency therof.

BACKGROUND—DESCRIPTION OF PRIOR ART

Common, esoteric and the Magnetic Piston Self Induction motors at least loosely work in the same manner and involve the interaction between the same parts; these being the stator and the rotor. They, by some means, develop opposing or alike magnetic polarities, resulting in movement of the rotor (usually rotationally) due to these attracting and/or repelling magnetic forces. These movements may then be utilized to perform work.

Electric generation devices or dynamos work like a motor in reverse. A driving force (combustion engines, steam engines, hydro wheels, etc.) moves a magnet through a wire coil. As the magnet's polarization changes inside the coil, an electric current is said to be induced within it.

OBJECTS AND ADVANTAGES

The objective of the Combination Reciprocating Motor and Inverter is not unlike that of other motors and engines; that is, to use mechanical energy to perform a function. Its uses are too numerous to list, but include a practical and economical source of power for almost any means of mechanical locomotion, the driving force behind machines and gadgetry, the provision of a rotational force needed by alternators, generators, or dynamos, and the force necessary to operate hydraulic equipment.

DRAWING FIGURES

Figure 4:
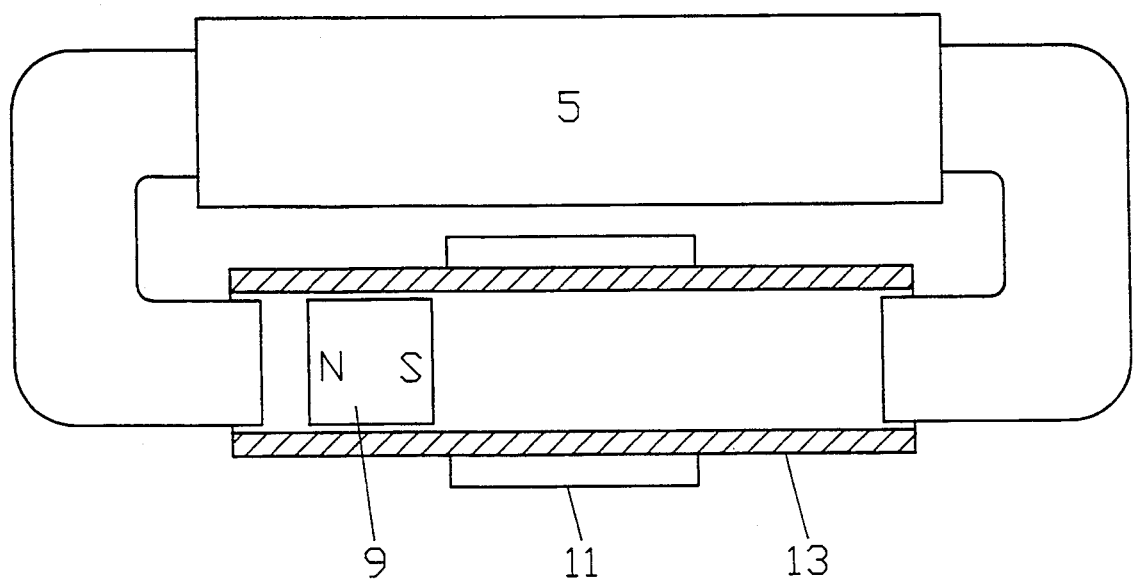

FIG. 4 also shows the motor in a "horseshoe" configuration.

Figure 5:
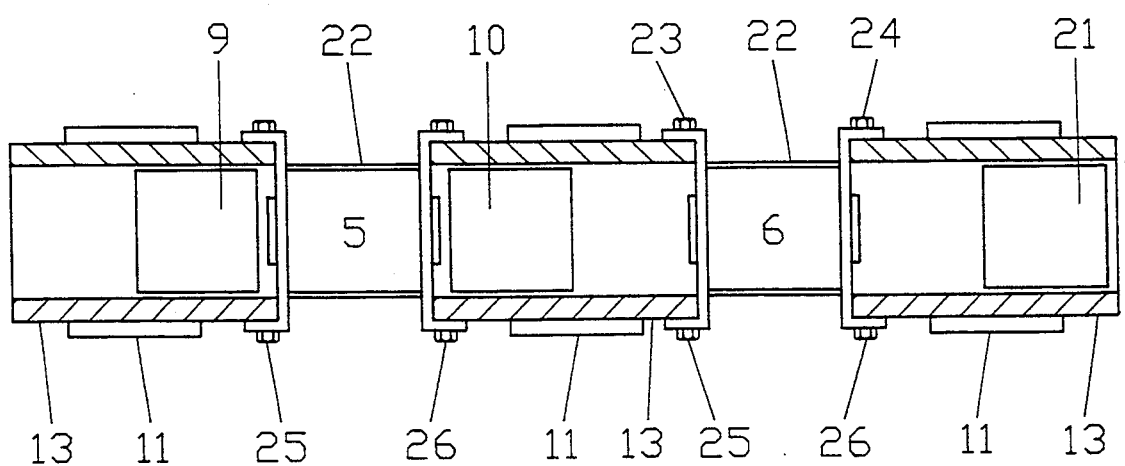

FIG. 5 shows the invention in a linear form in which two electromagnets exert forces on a central piston.

Figure 6:
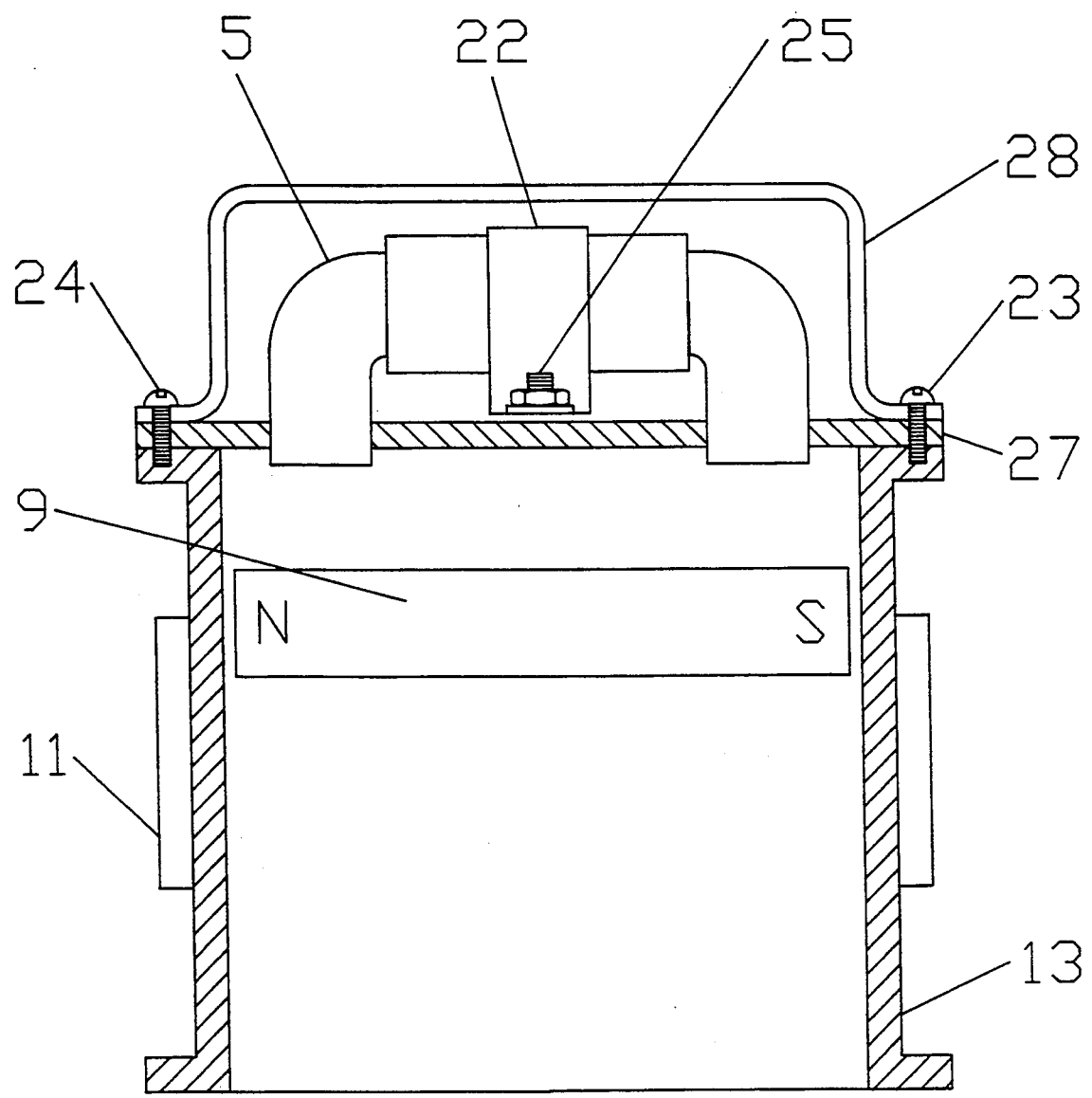

FIG. 6 shows the motor with a single piston and a single electromagnet.

Figure 1A:
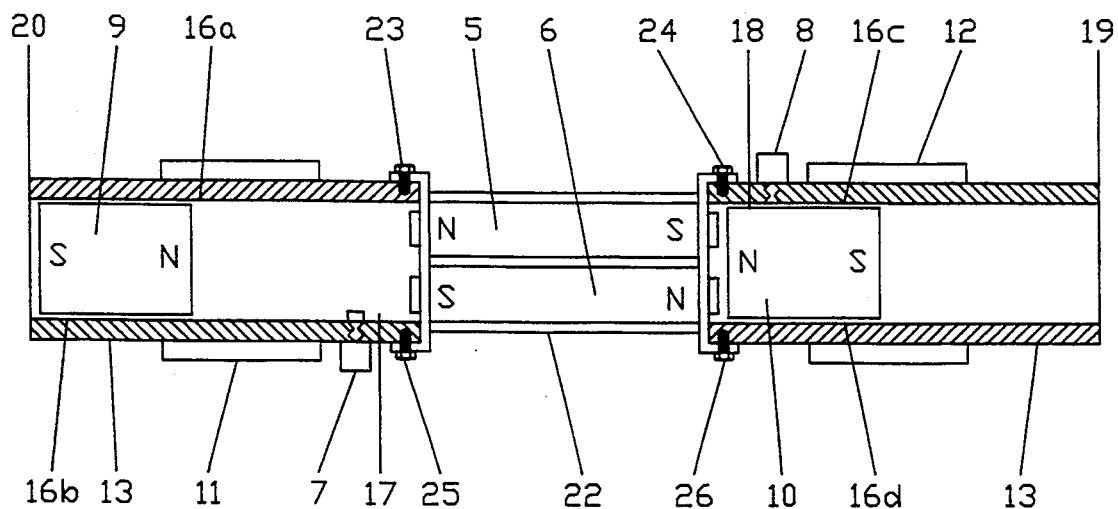
FIG. 1A shows the motor with two electromagnets (using direct current), and two magnetic pistons with like poles facing each other, resulting in their movement from left to right in unison.
Figure 7A:
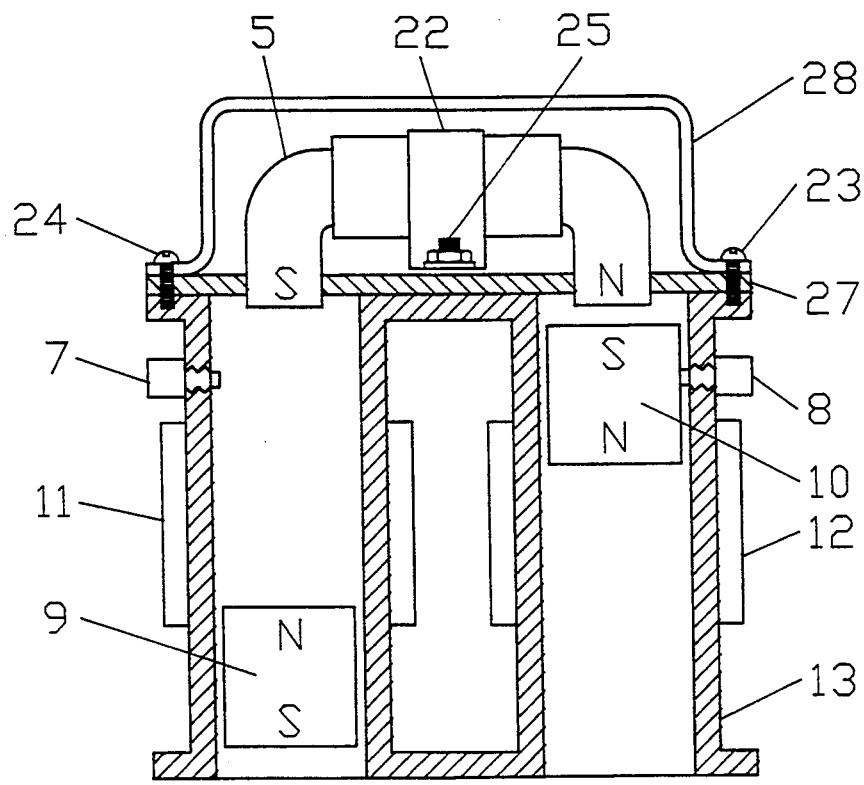

FIG. 7A shows the motor as it is seen in FIG. 1A, except for that only one electromagnet is provided, the polarity of which is changeable by means of a relay.

Figure 7B:
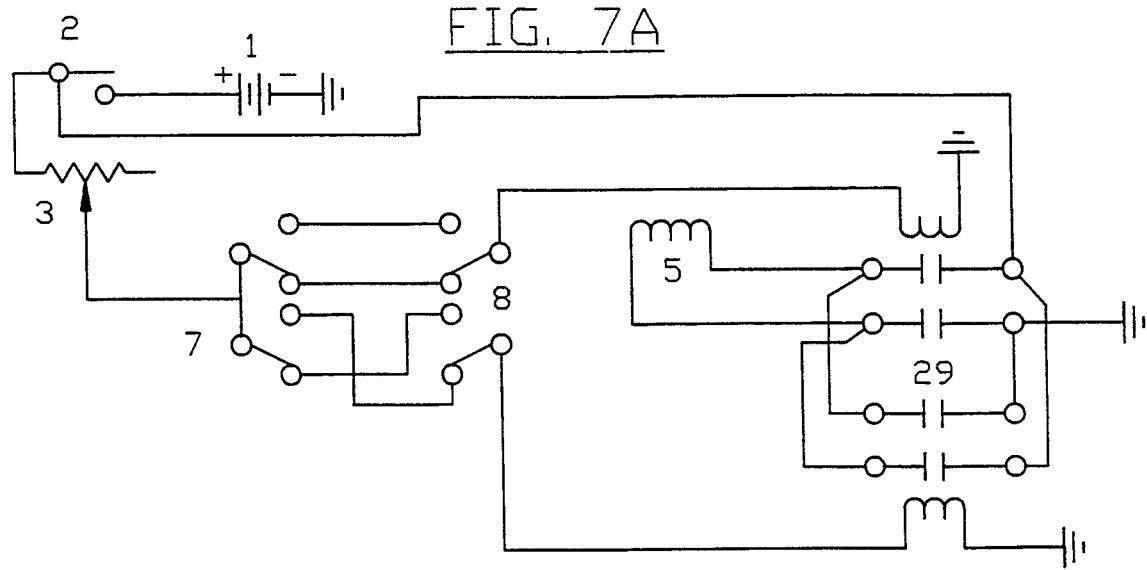

FIG. 7B offers a schematic diagram of the motor seen in FIG. 7A.

REFERENCE NUMERALS

1) Power Source
2) On/Off Switch
3) Rheostat
5) Electromagnet
6) Electromagnet
7) Switching Device
8) Switching Device
9) Permanent Magnet Piston
10) Permanent Magnet Piston
11) Induction Coil
12) Induction Coil
13) Cylinder
16) A—Friction Reduction Device
   B—Friction Reduction Device
   C—Friction Reduction Device
   D—Friction Reduction Device
17) Reference Point for Piston Location
18) Reference Point for Piston Location
19) Reference Point for Piston Location
20) Reference Point for Piston Location
21) Permanent Magnet Piston
22) Electromagnet Housing
23) Bolt
24) Bolt
25) Bolt
26) Bolt
27) Head Cap
28) Cover
29) Relay

DESCRIPTION—FIG. 1A

A typical embodiment of the Combination Reciprocating Motor and Inverter may be seen in FIG. 1. In this drawing, one can easily view and understand the simple principles of its operation.

Here a direct current power source 1 is turned on and off at switch 2. When current strength is regulated by a device such as rheostat 3. Current energized electromagnets 5 or 6 (but not simultaneously) depending on the position of permanent magnet pistons 9 and 10. These electromagnets act as the stator in the conventional electric motor, while the magnetic pistons serve as the rotor.

The electromagnets consist of a conductive material, such as copper wire, wound in an efficient manner around an easily magnitized material, such as a soft iron. The electromagnets are situated in such a way that they are poled opposite of each other. The electromagnets are fitted into electromagnet housing 22.

When one electromagnet is switched on, a magnetic field acts upon pistons 9 and 10. These pistons consist of permanent magnets and, in this example, each have north poles facing each other. These pistons travel in a linear and reprical fashion through cylinder 13. This cylinder is constructed of a non-magnetic material, such as aluminum, and is attached to electromagnet housing 22 by means of fastening devices such as bolts 23, 24, 25 and 26. Neither pistons or cylinders are necessarily cylindrical. The piston movement may be aided by the use of function reduction devices, such as bearings 16A, B, C and D.

If, for example, electromagnet 5 were to be switched on, pistons 9 and 10 would move to the left, since piston 9 would have a repulsive force with respect to electromagnet 5 (both have north poles facing each other), while piston 10 would have an attractive force (a north and a south pole). At this stage of operation, piston 9 is at point 20, while piston 10 is located at point 18. At such a time, a mechanism such as switching device 8 is activated, turning electromagnet 5 off, and sending power to electromagnet 6. Piston 9 then experiences attractive forces to the electromagnet resulting in its travel to point 17. Conversely, piston 10 is repelled to point 19.

When piston 9 reaches switch 7, current ceases to flow to electromagnet 6 and is restored to electromagnet 5. Swithing devices 7 and 8 are to be thought of here as double pole, double throw switches. This is for the purpose of illustration only. In practice, a variety of mechanical or electrical switches may be used, and it is most likely that a means to switch the current would be present on some sort of crank shaft or flywheel, which could only be designed with a singular use for the motor in mind. The applicant, therefore, does not wish to limit the uses of this motor by overly concerning himself with a particular means of routing current.

The movement of pistons 9 and 10 may be used to perform work.

As pistons 9 and 10 traverse back and forth through cylinder 13, they pass through induction coils 11 and 12. These coils consist of a conductive material, such as copper wire, wound in an efficient manner around cylinder 13. As the magnets serving as pistons pass through these coils, an electric current is induced within them.

Therefore, in this invention, the linear back and forth motion of the magnets serving as pistons, and used to perform work, also results in the inversion of, direct current to alternating current.

DESCRIPTION—FIG. 1B

Figure 1B:
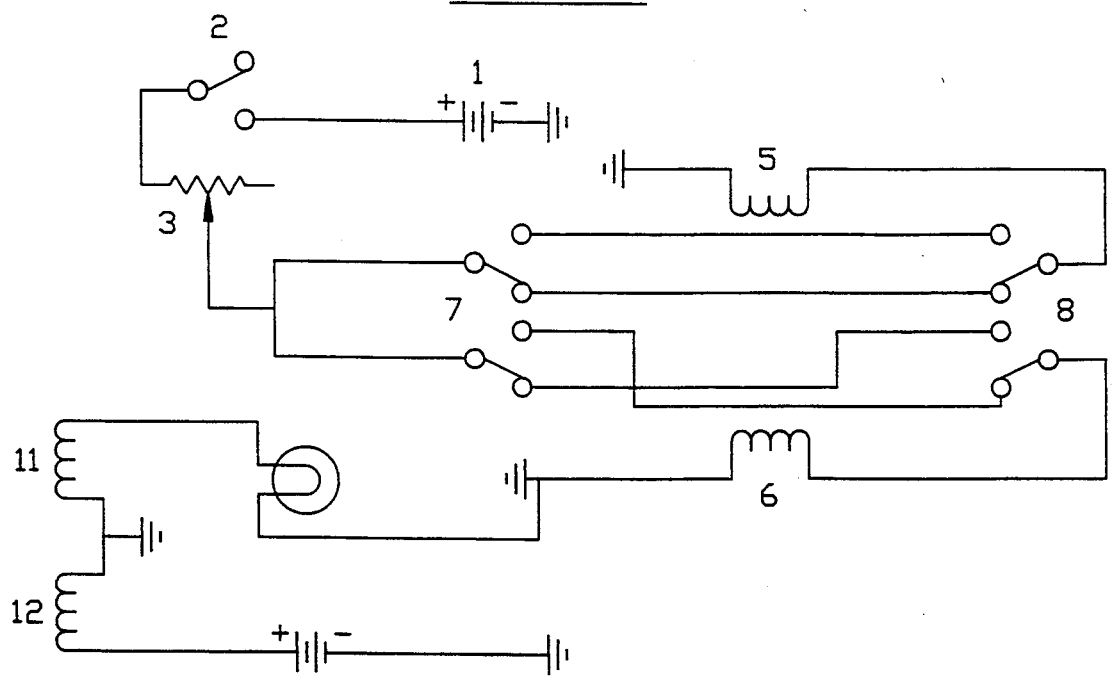
FIG. 1B is a schematic diagram depicting the device presented in FIG. 1A.

FIG. 1B is a schematic demonstrating the flow of electricity in FIG. 1A.

DESCRIPTION—FIG. 2

Figure 2:
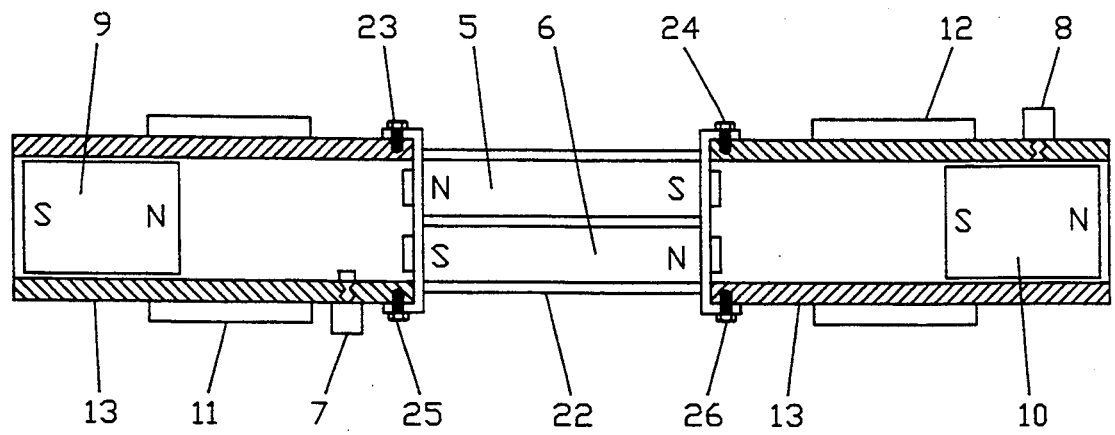
FIG. 2 shows the motor/inverter, also with two magnetic pistons, However, in this arrangement, the pistons have dissimilar poles facing the center electromagnets. This result in their movement toward and away from the electromagnet in unison.

FIG. 2 operates much like FIG. 1, except that pistons 9 and 10 have opposite poles facing the center. This results in their simultaneous movement toward and away from the electromagents.

Switches 7 and 8 are also seen in different locations. The positioning of these switches may be used to act as a type of gearing, in that if positioned to be tripped by the outward motion of piston 10 (as shown), the closer to center they are, the greater the magnetic forces are acting on the pistons, due to the closer proximity of piston and electromagnet with respect to each other. These switches may also be made to be movable, especially if they are triggered by the magnetic field of the piston itself. Such a movable switch would be especially desirable in applications such as a locomotive where great torque is necessary to innitiate movement, but a longer, more efficient stroke is desired once inertia is overcome.

DESCRIPTION—FIG. 3A

FIG. 3 depicts a "horseshoe" design with electromagnet 6 behind electromagnet 5. Here pistons 9 and 10 are positioned side by side, instead of in line as previously shown. In this case, the pistons are poled opposite of each other, so that they move in unison (both toward electromagnet, and both away from electromagnet) and therefore, are not impeaded by each other's magnetic force in so doing. Although if properly spaced, they may be poled alike, and move opposite of each other.

Switches 7 and 8 are also showed in a staggered array. Cover 28 encapsules the electromagnets and headcap 27 separates the cover from cylinder 13.

DESCRIPTION—FIG. 3B

Figure 3A:
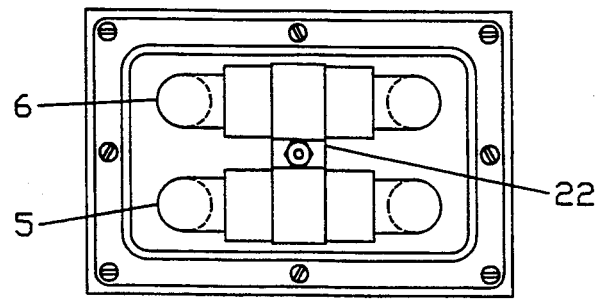
FIG. 3A is a top view of the device in a "horseshoe" configuration, where the magnetic pistons are poled opposite of each other.
Figure 3B:
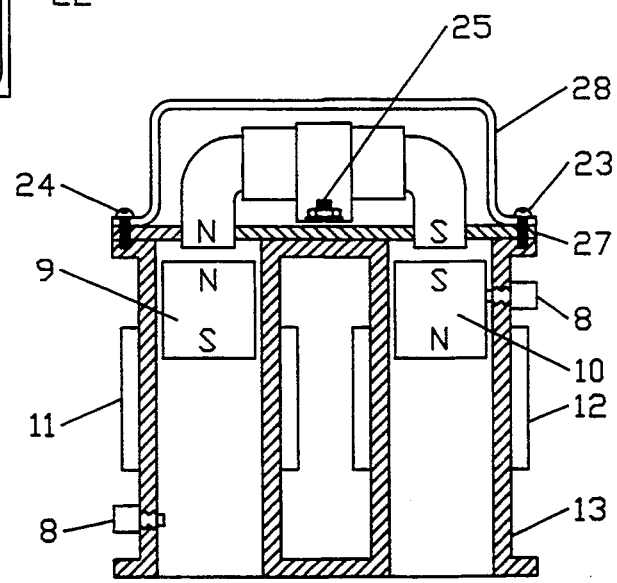
FIG. 3B is a side view of the device shown in FIG. 3A.

FIG. 3B is a side profile of FIG. 3A.

DESCRIPTION—FIG. 4

FIG. 4 utilizes a single electromagnet, single piston layout. In this example, electromagnet 5 is energized by an altarnating current. As the current flows in one direction, the electromagnet is poled to match. As the current reverses itself, so it is that the polarity of the electromagnet is reversed. Piston 9 is then forced to move back and forth, constantly reacting to the ever-changing polarities of the electromagnet.

DESCRIPTION—FIG. 5

FIG. 5 is a design which incorporates two alternating current electromagnets 5 and 6 and three magnetic pistons 9, 10 and 21. Here, the electromagnets operate in phase with respect to each other, resulting in the center piston being pushed and pulled by the magnetic forces emitted by both electromagnets, while the outermost pistons 9 and 21 are influenced by only one electromagnet.

DESCRIPTION—FIG. 6

FIG. 6 represents a single electromagnet, single piston layout not unlike that shown in FIG. 4, except in that the piston is driven toward and away from the electromagnet instead of from pole to pole. Although this example is not unlike common devices such as loudspeaker voice coils or silenoids, the presence of induction coil 11 and its preferred embodiment as a source of power in a drive system certainly is unique.

DESCRIPTION—FIG. 7A

FIG. 7 shows a direct current motor, also in a horseshoe shape, not unlike that shown in FIG. 3., except that only one electromagnet is present. The polarity of this electromagnet is changed by means of a relay.

DESCRIPTION—FIG. 7B

FIG. 7A is a schematic representation of the motor as shown in FIG. 7.

SUMMARY, RAMIFICATIONS AND SCOPE

Accordingly, one can see that the Combination Reciptocating Motor and Inverter is a device in which electric power is used to create a magnetic field within one or more electromagnets. This electromagnetic force is utilized by its interaction with the existing magnetic field of one or more permanent magnet(s) serving as a piston(s). The movement of the piston(s) may be employed to perform a function. And, in the process of doing this work, the pistons also may act as a voltage inverter by their passage through the induction coil(s).

The amount of work the motor is capable of performing per units energy input is dependent upon several factors, most notably being the design of the electromagnet(s) (hence, its generated magnetic field), the strength of the magnetic field emitted by the permanent magnet piston(s), and the amount of energy lost to external factors such as friction. It should be noted here that designs incorporating multiple electromagnets would experience less heat build up, and a limitation of their magnetic flux due to hysteresis. Likewise, the amount of induced or reclaimed energy in the induction coil(s) is also dependent on several factors, but may be found by invoking Ohm's law. The resistance to electrical flow of the coil material, the distance between coil and piston (air gap), the number of loops (and their spacing) in the coil, as well as the magnetic strength, speed and number of oscillations of the permanent magnet piston all influence how much electricity will be generated.

Therefore, the most critical component of the motor, in terms of its efficiency, is the permanent magnet piston. This is so because it, in part, determines the amount of work the motor is capable of doing, as well as the device's ability to act as a voltage inverter.

This inverted electricity may be relegated to serve many purposes which include, but are not intended to be limited to: being re-fed into the system, the driving of other systems, the powering of a mechanism to better position the electromagnets in a multiple electromagnet array, storage in a battery, the provision of current for a suplemental electromagnet, or any combination of the afforementioned.

As illustrated in FIGS. 1, 1A, 2, 3, 4, 5, 6, 7 and 7A, the basic premise of this motor may take many forms. These may include hybrid designs of those shown, or an endless array, too numerous to be illustrated. So it must be stated that the common factors in any Combination Reciprocating Motor and Inverter design described in this patent include electromagnet(s) interacting with permanent magnets to propel the permanent magnets through induction coils as they perform a function. Therefore, the energy used to perform work (the piston movement) manifests itself with the ability to invert electric current.

The magnetic piston's linear motion will also be accompanied with a rotational movement which may be utilized in some particular applications. This may be accomplished by the use of a threaded rod connecting the piston and subject of the application.

I claim:

1. A combination electrically powered direct current reciprocating motor and inverter comprising more than one permanent magnet functioning as a piston, more than one non-magnetizable enclosure through which said permanent magnets pass, one or more electromagnets used to drive the pistons, each electromagnet placed at the ends of at least two of the non-magnetizable enclosures and one or more induction coils placed around the non-magnetizable enclosures and used to provide a source of alternating current power.

* * * * *